(12) United States Patent
Puttagunta et al.

(10) Patent No.: US 11,341,074 B2
(45) Date of Patent: May 24, 2022

(54) UNIVERSAL HOST AND NON-VOLATILE MEMORY EXPRESS STORAGE DOMAIN DISCOVERY FOR NON-VOLATILE MEMORY EXPRESS OVER FABRICS

(71) Applicant: HEWLETT PACKARD ENTERPRISE DEVELOPMENT LP, Houston, TX (US)

(72) Inventors: Krishna Babu Puttagunta, Roseville, CA (US); Rupin T. Mohan, Andover, MA (US); Vivek Agarwal, Andover, MA (US); Komateswar Dhanadevan, Bangalore (IN); Dheeraj Sharma, Bangalore (IN); Asutosh Satapathy, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 59 days.

(21) Appl. No.: 16/457,427

(22) Filed: Jun. 28, 2019

(65) Prior Publication Data
US 2020/0409893 A1 Dec. 31, 2020

(51) Int. Cl.
*G06F 13/38* (2006.01)
*G06F 13/40* (2006.01)
*H04L 69/16* (2022.01)

(52) U.S. Cl.
CPC ......... *G06F 13/4027* (2013.01); *H04L 69/16* (2013.01)

(58) Field of Classification Search
CPC .............................. G06F 13/4027; H04L 69/16
See application file for complete search history.

(56) References Cited

U.S. PATENT DOCUMENTS

| 9,712,619 | B2 | 7/2017 | Malwankar et al. |
| 9,785,355 | B2 | 10/2017 | Huang |
| 10,534,541 | B2 * | 1/2020 | Ish ...................... G06F 13/4282 |
| 10,592,162 | B2 * | 3/2020 | Peterson ............... G06F 3/0655 |
| 10,901,636 | B2 * | 1/2021 | Enz ......................... G06F 3/067 |

(Continued)

OTHER PUBLICATIONS

NVMe, NVM Express Base Specification, 2019, pp. 1-403.*

(Continued)

*Primary Examiner* — Cheng Yuan Tseng
(74) *Attorney, Agent, or Firm* — Trop, Pruner & Hu, P.C.

(57) ABSTRACT

In some examples, universal host and NVMe™ storage domain discovery for NVM Express™ over Fabrics (NVMe-oF™) may include broadcasting location parameters to a host and a plurality of NVMe™ storage domains for discovery of a NVM Express™ over Fabrics (NVMe-oF™) service. Based on host parameters and NVMe™ storage domain parameters received in response to the broadcast location parameters, the host and the NVMe™ storage domains may be respectively registered with the NVMe-oF™ service. A mapping that indicates a specified NVMe™ storage domain that is to communicate with the host may be obtained. Communication may be implemented between the host and the specified NVMe™ storage domain by forwarding the mapping and associated discovery target parameters to the host to implement discovery of the specified NVMe™ storage domain by the host, and connection of the specified NVMe™ storage domain to the host.

20 Claims, 8 Drawing Sheets

(56) References Cited

U.S. PATENT DOCUMENTS

2018/0081558 A1  3/2018  Ish et al.

OTHER PUBLICATIONS

Broadcom, "Brocade Fabric OS Administration Guide, 8.2.0a", May 10, 2018, pp. 385-386. <https://docs.broadcom.com/docs/53-1005237-05?eula=true>.
FCIA, "Introducing FC-NVMe," 2017, 59 pages. https://fibrechannel.org/wp-content/uploads/2017/02/FC-NVMe-Webinar-Final.pdf.
InfiniBandTM Trade Association, "RDMA over Converged Ethernet (RoCE)", Supplement to InfiniBandTM Architecture Specification, vol. 1, Release 1.2.1, Annex A16, Apr. 6, 2010, 19 pages. <https://cw.infinibandta.org/document/dl/7148>.
InfiniBandTM Trade Association, "RoCEv2", Supplement to InfiniBandTM Architecture Specification, vol. 1, Release 1.2.1, Annex A17, Sep. 2, 2014, 23 pages. <https://cw.infinibandta.org/document/dl/7781>.
Ko, et al., "Internet Small Computer System Interface (iSCSI) Extensions for Remote Direct Memory Access (RDMA)," Oct. 2007, Network Working Group, Request for Comments: 5046, 85 pages. <https://tools.ietf.org/html/rfc5046>.
Tseng, et al., "Internet Storage Name Service (iSNS)," Sep. 2005, 123 pages. <https://tools.ietf.org/pdf/rfc4171 pdf.

* cited by examiner

NVME HOST REGISTRATION 600

*Key Fields*

| | | |
|---|---|---|
| 1. | Client Type | Host |
| 2. | NQN | NVMe Qualified Name |
| 3. | Interface IP address | IPv4 |
| 4. | Protocol Supported | RDMA (RoCE v2) |
| 5. | MAC Address | Protocol MAC Address |

*FIG. 6*

NVME DISCOVERY TARGET REGISTRATION 700

*Key Fields*

| | | |
|---|---|---|
| 1. | Client Type | Discovery Target |
| 2. | Interface IP Address | IPv4 Discovery Target IP address |
| 3. | Protocol Supported | RDMA (RoCE v2) |
| 4. | MAC Address | Protocol MAC address |
| 5. | NVMe Port ID | NVMe Port ID |

*FIG. 7*

BROADCAST, FROM A NON-VOLATILE MEMORY EXPRESS (NVME) NAME SERVER (NNS) DEPLOYED IN A SWITCH CONTAINER, A VIRTUAL MACHINE, OR AN NVME STORAGE DOMAIN OF A PLURALITY OF NVME STORAGE DOMAINS, LOCATION PARAMETERS TO A PLURALITY OF HOSTS AND THE PLURALITY OF NVME STORAGE DOMAINS FOR DISCOVERY OF AN NVME OVER FABRICS (NVME-OF) SERVICE
902

REGISTER, BASED ON HOST PARAMETERS RECEIVED IN RESPONSE TO THE BROADCAST LOCATION PARAMETERS, THE PLURALITY OF HOSTS WITH THE NVME-OF SERVICE
904

REGISTER, BASED ON NVME STORAGE DOMAIN PARAMETERS RECEIVED IN RESPONSE TO THE BROADCAST LOCATION PARAMETERS, THE PLURALITY OF NVME STORAGE DOMAINS WITH THE NVME-OF SERVICE
906

IMPLEMENT, BASED ON THE REGISTRATION OF THE PLURALITY OF HOSTS AND THE PLURALITY OF NVME STORAGE DOMAINS, COMMUNICATION BETWEEN A SPECIFIED HOST OF THE PLURALITY OF HOSTS AND A SPECIFIED NVME STORAGE DOMAIN OF THE PLURALITY OF NVME STORAGE DOMAINS
908

FIG. 9

UNIVERSAL HOST AND NON-VOLATILE MEMORY EXPRESS STORAGE DOMAIN DISCOVERY FOR NON-VOLATILE MEMORY EXPRESS OVER FABRICS

BACKGROUND

Non-volatile memory (NVM) is a type of computer memory that retains its contents across power cycles and is therefore capable of being used as storage. Compared to volatile memory that needs power to retain data, NVM may continue to store data even after computer power is turned off. With respect to NVM, NVM Express (NVMe) is a logical device interface specification for accessing NVM.

BRIEF DESCRIPTION OF DRAWINGS

Features of the present disclosure are illustrated by way of example and not limited in the following figure(s), in which like numerals indicate like elements, in which:

FIG. 6 illustrates key fields with respect to NVMe host registration to illustrate operation of the universal host and NVMe storage domain discovery for NVMe-oF apparatus of FIG. 1 in accordance with an example of the present disclosure;

FIG. 7 illustrates key fields with respect to NVMe discovery target registration to illustrate operation of the universal host and NVMe storage domain discovery for NVMe-oF apparatus of FIG. 1 in accordance with an example of the present disclosure;

FIG. 9 illustrates a flowchart of an example method for universal host and NVMe storage domain discovery for NVMe-oF in accordance with an example of the present disclosure.

DETAILED DESCRIPTION

Figure 1:
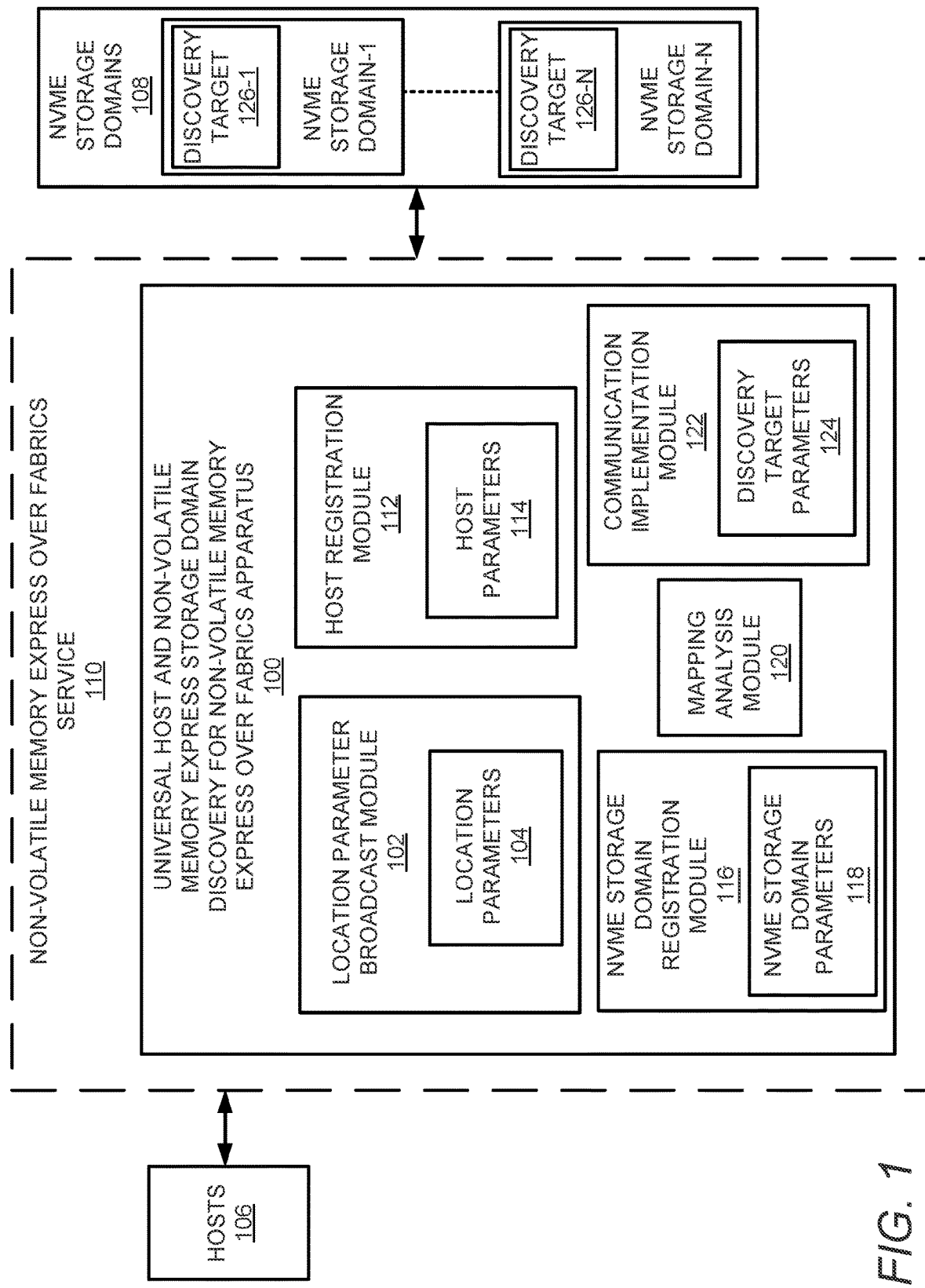
FIG. 1 illustrates a layout of a universal host and non-volatile memory (NVM) Express (NVMe) storage domain discovery for NVMe over Fabrics (NVMe-oF) apparatus in accordance with an example of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Universal host and non-volatile memory (NVM) Express (NVMe) storage domain discovery for NVMe over Fabrics (NVMe-oF) apparatuses, methods for universal host and NVMe storage domain discovery for NVMe-oF, and non-transitory computer readable media having stored thereon machine readable instructions to provide universal host and NVMe storage domain discovery for NVMe-oF are disclosed herein. The apparatuses, methods, and non-transitory computer readable media disclosed herein provide for registration of hosts and NVMe storage domains with respect to an NVMe-oF, as well as discovery of a specified NVMe storage domain by a specified host, and connection of the specified NVMe storage domain to the specified host.

With respect to the NVMe protocols, a storage system may handle and service thousands of disk read or write commands in parallel. In order to implement these benefits to enterprise class data centers, NVMe may be extended over fabrics for increased scalability and shareability. In this regard, NVMe-oF is a flexible transport abstraction layer that provides for a consistent definition of NVMe over different fabric types, including Ethernet and Fibre Channel. NVMe over Ethernet may be dependent on multiple transport layers based, for example, on remote direct memory access (RDMA), RDMA over Converged Ethernet (RoCE) v1/v2, Internet Wide-area RDMA Protocol (iWARP), or transmission control protocol/Internet Protocol (TCP/IP).

In a relatively large enterprise class fabric (irrespective of protocol), end nodes, such as hosts (also referred to as initiators), may need to discover NVMe storage domain devices (also referred to as targets) on the fabric with which they may securely communicate. With respect to NVMe over Ethernet fabric, it is technically challenging for hosts to discover other NVMe storage domains. For example, with respect to an Ethernet fabric, multiple hosts may be connected to one side of the Ethernet fabric, and multiple NVMe storage domains may be connected to another side of the Ethernet fabric. A host may need to selectively communicate with one of the NVMe storage domains (and vice versa). An Ethernet fabric may include hundreds or thousands of such hosts and NVMe storage domains. In this regard, it is technically challenging to implement discovery and connection of NVMe storage domains that different hosts are to communicate with.

Examples described herein may address these issues by implementing an NVMe Name Server (NNS), implemented herein as a universal host and NVMe storage domain discovery for NVMe-oF apparatus. The host and NVMe storage domain devices may register into the universal host and NVMe storage domain discovery for NVMe-oF apparatus. NVMe input/output may follow protocols such as RDMA (RocEv1, v2 or iWARP) or TCP/IP. In this regard, during initial discovery, the universal host and NVMe storage domain discovery for NVMe-oF apparatus may implement a mechanism across all of these protocols (e.g., RDMA (RocEv1, v2 or iWARP) or TCP/IP). Further, during initial registration, the host and NVMe storage domain devices may utilize protocols such as TCP/IP or Link Layer Discovery Protocol (LLDP). In this regard, the universal host and NVMe storage domain discovery for NVMe-oF apparatus may utilize a TCP/IP payload and package structure to implement the initial registration of the host(s) and NVMe storage domain(s). Once the NVMe storage domain(s) is registered with the universal host and NVMe storage domain discovery for NVMe-oF apparatus, the registration information may be passed to the host(s) for host registration as well.

In examples described herein, module(s), as described herein, may be any combination of hardware and programming to implement the functionalities of the respective module(s). In some examples described herein, the combinations of hardware and programming may be implemented in a number of different ways. For example, the programming for the modules may be processor executable instructions stored on a non-transitory machine-readable storage medium and the hardware for the modules may include at least one processing resource (e.g., at least one processor, CPU, circuitry, etc.) to execute those instructions. In these examples, a computing device implementing such modules may include the machine-readable storage medium storing the instructions and the processing resource to execute the instructions, or the machine-readable storage medium may be separately stored and accessible by the computing device and the processing resource. In some examples, some modules may be implemented in circuitry.

FIG. 1 illustrates a layout of an example universal host and NVMe storage domain discovery for NVMe-oF apparatus (hereinafter also referred to as "apparatus 100").

Referring to FIG. 1, the apparatus 100 may include a location parameter broadcast module 102 to broadcast location parameters 104 to a plurality of hosts 106 (or a single host) and a plurality of storage domains, an example of which includes NVMe storage domains 108 (or a single NVMe storage domain), for discovery of a storage access protocol fabric service, an example being an NVM Express™ over Fabrics (NVMe-oF) service 110. Each NVMe storage domain may include a discovery target (also referred to as a discovery controller). For the example of FIG. 1, the discovery targets are designated 126-1, . . . 126-N, corresponding to NVMe storage domain-1, . . . NVMe storage domain-N. The NVMe-oF service 110 may be attached to, be aware of, be part of, be associated with, and/or be otherwise related to a fabric to which the hosts 106 and NVMe storage domains 108 are communicatively connected.

A host registration module 112 may register, based on host parameters 114 received in response to the broadcast location parameters 104, the plurality of hosts 106 with the NVMe-oF service 110.

According to examples disclosed herein, the host registration module 112 may obtain the host parameters 114 that include, for each host of the plurality of hosts 106, a host Internet Protocol (IP) address, and a host media access control (MAC) address, host NVMe qualified name (NQN), host transport type, and host port. According to examples disclosed herein, a host agent software running in user space may collect the host parameters 114 using, for example, host nvme-cli (ioctl) calls. The host parameters 114 may be used to form a registration packet to be sent to the apparatus 100. The host registration module 112 may register, based on the obtained host parameters received in response to the broadcast location parameters 104, the plurality of hosts 106 with the NVMe-oF service 110.

An NVMe storage domain registration module 116 may register, based on NVMe storage domain parameters 118 received in response to the broadcast location parameters 104, the plurality of NVMe storage domains 108 with the NVMe-oF service 110.

According to examples disclosed herein, the NVMe storage domain registration module 116 may obtain the NVMe storage domain parameters 118 that include, for each NVMe storage domain of the plurality of NVMe storage domains 108, an NVMe storage domain discovery target Internet Protocol address, an NVMe storage domain MAC address, an NVMe storage domain port identification, and an NVMe storage domain transport type. According to examples disclosed herein, an NVMe storage domain agent software running in user space may collect the NVMe storage domain parameters 118 using either NVMe storage domain nvme-cli calls if using a Kernel mode driver or using appropriate remote procedure call (RPC) calls if using a storage performance development kit (SPDK) driver. The NVMe storage domain parameters 118 may be used to form a registration packet to be sent to the apparatus 100. Further, the NVMe storage domain registration module 116 may register, based on the obtained NVMe storage domain parameters 118 received in response to the broadcast location parameters 104, the plurality of NVMe storage domains 108 with the NVMe-oF service 110.

A mapping analysis module 120 may obtain a mapping that indicates a specified host of the plurality of hosts 106 that is to communicate with a specified NVMe storage domain of the plurality of NVMe storage domains 108.

With respect to mapping between the hosts 106 and the NVMe storage domains 108, mapping or access controls (e.g., which hosts can talk to which NVMe subsystems of a specified NVMe storage domain) may be provided via creating and configuring discovery domains (DDs). In this regard, the mapping may create DDs with the membership of the DD being determined using one of several techniques as disclosed herein, the DD information may be used to communicate the mapping, and changes in the DD may cause notifications.

With respect to mapping, one technique may include using NNS administrative tools (command line interface (CLI) or graphical user interface (GUI)) to create appropriate DDs. The DD membership may include host NQN, host transport address, as well as target transport type and transport address (of discovery target). In this regard, a communication implementation module 122 may send a notification to the host, and the host may read DD contents from the communication implementation module 122 and send appropriate nvme discover/connect commands to establish connectivity automatically without further user intervention.

With respect to another technique of mapping, a user may configure mapping on the NVMe storage domain side first, and the NVMe storage domain may automatically create DDs by talking to the communication implementation module 122 with some pre-assigned administrative privileges. This technique may be denoted NVMe storage domain driven discovery domain (NDDDD) creation.

In the aforementioned examples of mapping, as soon as DDs are created, the communication implementation module 122 may send a change notification to all of the affected hosts. On receipt of the notifications, the hosts may send query commands to the communication implementation module 122, and receive the contents of a new DD when it is first created or any changes to the DD subsequently. Once the hosts have this information, the information may be parsed to determine which NVMe storage domains the hosts may communicate with and accordingly send discover and connect commands, or directly connect commands to establish communication with the appropriate NVMe subsystems.

The communication implementation module 122 may thus implement communication between the specified host and the specified NVMe storage domain by forwarding the mapping and associated discovery target parameters 124 to the specified host. In this regard, after receiving the mapping information, the specified host may implement discovery of the specified NVMe storage domain by the specified host, and implement connection of the specified NVMe storage domain to the specified host. Thus, the communication implementation module 122 may communicate with hosts to forward the mapping information (e.g., discovery domain or zoning information) so that a host may take action to initiate communication with NVMe storage domains to establish connectivity. The mapping information may thus include information about the accessible discovery targets, such as the discovery targets that are mapped to a host.

According to examples disclosed herein, the discovery target parameters 124 to implement discovery of the specified NVMe storage domain by the specified host may include a transport type associated with the specified NVMe storage domain, a transport address associated with the specified NVMe storage domain, a transport identification associated with the specified NVMe storage domain, a host transport address associated with the specified host, and a host NVMe qualified name associated with the specified host.

According to examples disclosed herein, the discovery target parameters 124 to implement connection of the specified NVMe storage domain to the specified host may include a transport type associated with the specified NVMe storage domain, a transport address associated with the specified NVMe storage domain, a transport identification associated with the specified NVMe storage domain, a host transport address associated with the specified host, a host NVMe qualified name associated with the specified host, and an NVMe storage domain NVMe qualified name associated with the specified NVMe storage domain.

Figure 2:
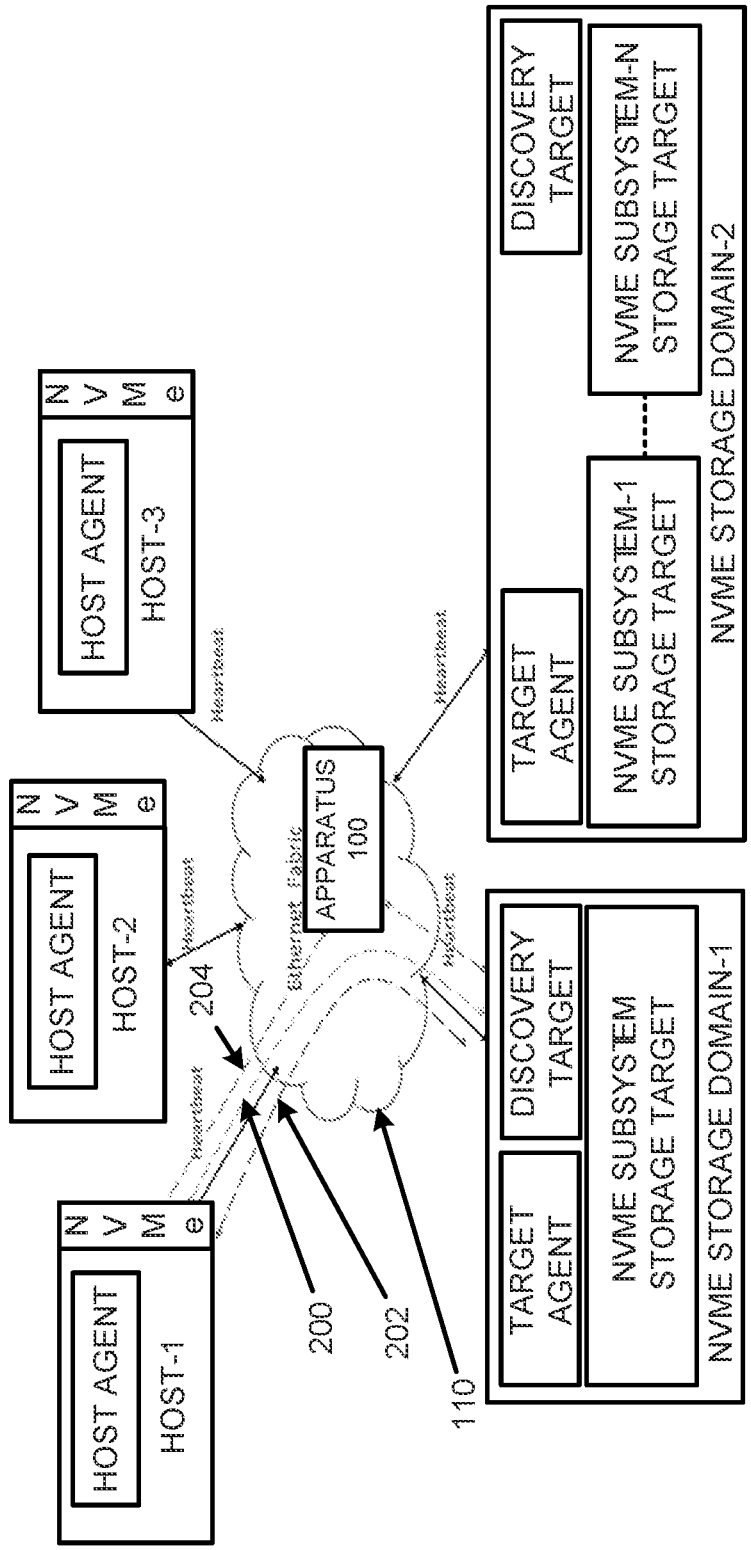
FIG. 2 illustrates a layout of hosts and NVMe storage domains with respect to the universal host and NVMe storage domain discovery for NVMe-oF™ apparatus of FIG. 1 in accordance with an example of the present disclosure.

FIG. 2 illustrates a layout of hosts and NVMe storage domains with respect to the apparatus 100 in accordance with an example of the present disclosure.

Referring to FIG. 2, the hosts (e.g., initiators) denoted Host-1, Host-2, Host-3, etc., may recognize the apparatus 100 via a heartbeat or broadcast mechanism, and register with the apparatus 100. For example, the hosts may locate the address of the apparatus 100 in the NVMe-oF service 110. Similarly, in the example of FIG. 2, the NVMe storage domain devices denoted JBOF (NVMe Subsystem), may recognize and register with the apparatus 100.

As shown in FIG. 2, each NVMe storage domain may include a target agent (which may also be designated as an NNS-TGT-Agent). The target agent may represent an application that resides on an NVMe storage domain, and handles communication between the NVMe storage domain and the apparatus 100. Each NVMe storage domain may further include a discovery target (which may also be designated as an NVMe discovery controller). The discovery target may provide subsystem information to a host. Further, each NVMe storage domain may include an NVMe subsystem (which may also be designated as a target-subsystem). The NVMe subsystem may represent the NVMe storage domain subsystem that includes controllers and namespaces, and handles input/output.

The target agent may represent a user space application to handle all communication between the apparatus 100 and the NVMe storage domain. The target agent may collect all the required information as disclosed herein with reference to FIG. 7. Once this information is collected, the target agent may perform registration with the apparatus 100 on behalf of the NVMe storage domain.

Similarly, the host agent on the host side may collect information as shown in FIG. 6, and perform the registration with the apparatus 100.

Once the apparatus 100 obtains the registration information from both the host and the NVMe storage domain, the information may be compiled into a database for further processing by the apparatus 100.

As disclosed herein, the communication and protocol (TCP/IP protocol and well defined packet structures) may be transparent to the final transport protocol between the host and the NVMe storage domain. For example, the transport protocol between the host and the NVMe storage domain (e.g., discovery target and/or NVMe subsystem) may be RoCEv1, RoCEv2, iWARP or TCP/IP for transacting actual input/output.

With respect to discovery domain (DD) creation as disclosed herein, once the apparatus 100 creates a database of clients (e.g., hosts and NVMe storage domains) an administrator with access permissions to the apparatus may create DDs that represent a mapping between a host(s) and NVMe subsystem(s). Based on the creation of DDs, a host(s) specified in the DD may see and communicate with a partial list of NVMe storage domain (a) as defined in the DD or zone.

The apparatus 100 and the host(s) may utilize a well-defined mechanism to pass the DD information in terms of notifications, queries and their response.

Once the host(s) obtains the discovery target IP address, port number and transport type from apparatus 100, the host may perform an NVMe over fabrics discovery operation by sending a discovery fabric command to an appropriate discovery target, and fetch NVMe target subsystem information from the log pages sent by the discovery target in reply to the discovery fabric command sent by the host.

Once the NVMe target subsystem information is available, the host may perform an NVMe over fabrics connect operation to the associated NVMe subsystem.

The apparatus 100 may be located, for example, either in a switch (e.g., embedded in a container), in an external virtual machine (VM), or in an NVMe storage domain device. The apparatus 100 may receive an indication of mapping of a specified host to a specified NVMe storage domain to implement communication between the specified host and the specified NVMe storage domain. The specified host may then communicate with the specified NVMe storage domain, where nvme discover and nvme connect commands may be implemented by the apparatus 100. For example, the nvme discover commands may include a transport type specification (e.g., RDMA, etc.), a transport address (e.g., IP address), a transport service ID (e.g., port number), host transport address, host NQN, etc. Further, the nvme connect commands may be used by a host to establish the communication with a specified NVMe storage domain.

In the example of FIG. 2, the path 200 may represent NVMe input/output (e.g., RDMA (RocEv1, v2, or iWARP), or TCP/IP). The path 202 may represent initial discovery (e.g., RDMA (RocEv1, v2, or iWARP), or TCP/IP). Further, the path 204 may represent initial registration (e.g., TCP/IP, or LLDP).

With respect to deployment of the apparatus 100 in a container (e.g., a switch container), the apparatus 100 may be embedded in hardware without need for any additional server or workstation.

With respect to deployment of the apparatus 100 as a VM in an external server, the apparatus 100 deployed as a VM may operate with multiple fabrics.

With respect to deployment of the apparatus 100 in an NVMe storage domain, this deployment may be implemented, for example, with relatively large storage arrays.

Figure 3:
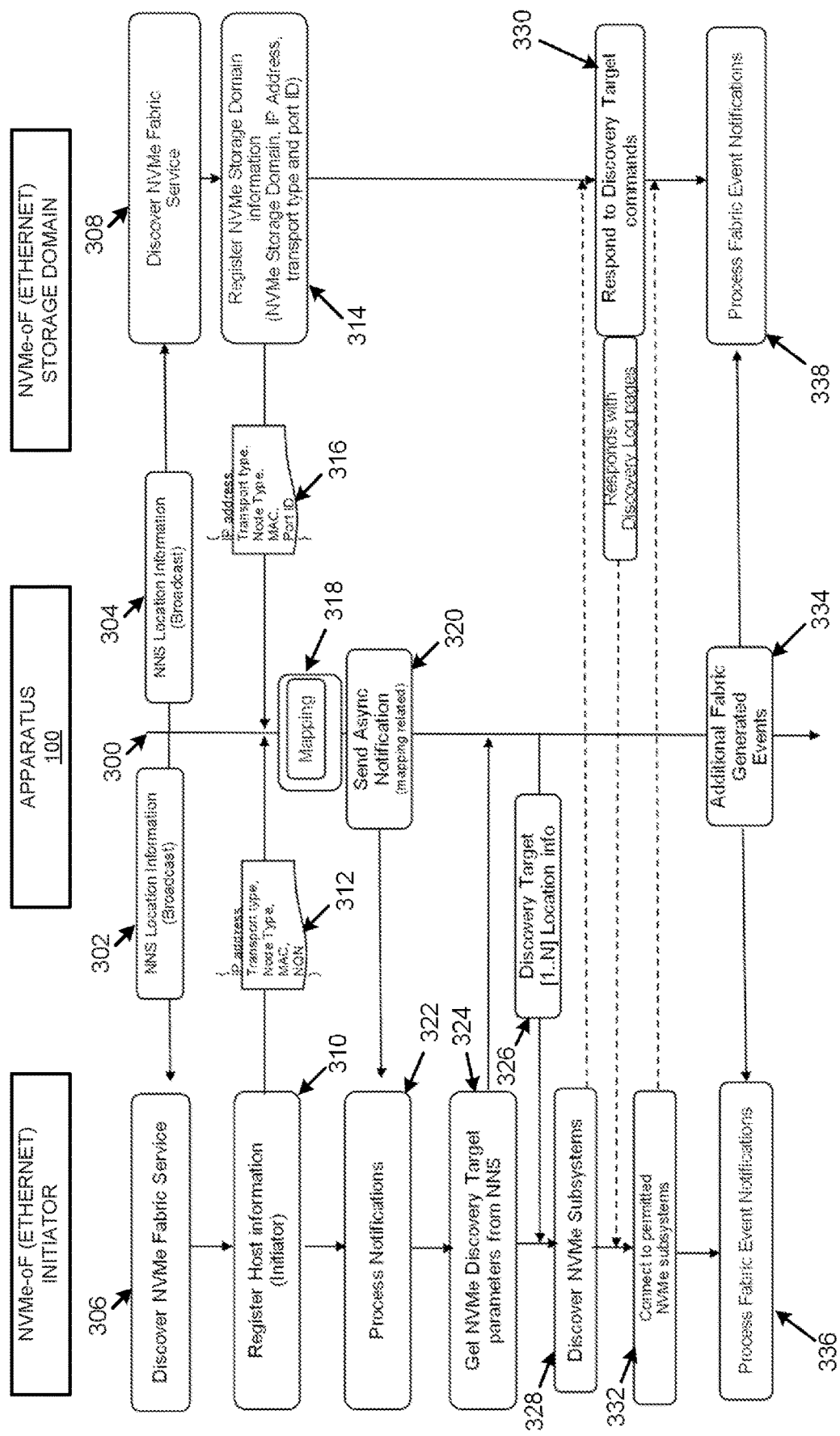
FIG. 3 illustrates operation of the universal host and NVMe storage domain discovery for NVMe-oF apparatus of FIG. 1 in accordance with an example of the present disclosure.

FIG. 3 illustrates operation of the apparatus 100 in accordance with an example of the present disclosure. In this regard, FIG. 3 illustrates a sequence of events that include identification of the apparatus 100, performance of host and NVMe storage domain registrations, receiving of notifications from the apparatus 100, querying and receiving of NVMe storage domain information, completion of final NVMe discovery, and implementation of connections between hosts and specified NVMe storage domains.

Referring to FIG. 3, at 300, the location parameter broadcast module 102 may broadcast presence of the apparatus 100 to all host and NVMe storage domain devices. For example, the location parameter broadcast module 102 may broadcast location parameters 104 to a plurality of hosts 106 (or a single host) and a plurality of NVMe storage domains 108 (or a single NVMe storage domain) for discovery of the NVMe-oF service 110. Examples of location parameters 104 may include IP address and port number for the apparatus 100. The apparatus 100 may be executed on switches or an external VM, and broadcast its presence to all host and NVMe storage domain devices as a pre-configured IP address (e.g., an IPv4/IPv6 address such as 10.10.10.2), and TCP port number (e.g., a port number such as 4420). The host and NVMe storage domain devices within the broadcast range may recognize the IP address of the apparatus 100. For the example of FIG. 3, the broadcast to the host and NVMe storage domain devices may be specified as "NNS location parameters (broadcast)" at 302 and 304, respectively.

At 306, a host (e.g., each host) may discover the NVMe-oF service 110.

At 308, an NVMe storage domain may discover the NVMe-oF service 110.

At 310 and 312, host registration information (e.g., IP address, transport type, node type, MAC address, NQN) may be sent to the apparatus 100. The host-specific information may also be denoted "host-specific parameters".

At 314 and 316, the NVMe storage domain-specific information (e.g., IP address, transport type, node type, MAC address, NQN) may be sent to the apparatus 100.

At 318, with respect to mapping between the hosts 106 and the NVMe storage domains 108, mapping or access controls (e.g., which hosts can talk to which NVMe subsystems of a specified NVMe storage domain) may be provided via creating and configuring DDs as disclosed herein. In this regard, the mapping analysis module 120 may receive mapping details with respect to hosts and NVMe storage domains. For example, the mapping details may include an indication of hosts and NVMe storage domains that are to communicate with each other. In this regard, a single host may be mapped to communicate with a single NVMe storage domain, or a plurality of NVMe storage domains, and vice versa. Once the mapping is completed, a notification may be sent to each host, and the host(s) may send a command to the apparatus 100 to obtain control information as to which NVMe storage domain(s) the host(s) may communicate with. For example, the host may send an NNSpDevQry in response to state change notification from the apparatus 100.

At 320, the apparatus 100 may send an asynchronous notification to hosts as disclosed herein. For example, DD changes may also cause an asynchronous notification to be sent.

At 322, a host may receive and process the asynchronous notification from block 320.

At 324, a host may send a request to get NVMe discovery target parameters. In this regard, the NVMe discovery target parameters may be requested for the NVMe storage domain that a host is allowed to communicate with (e.g., that a host is mapped to), from the apparatus 100.

At 326, the communication implementation module 122 may provide discovery target information to the host. The discovery target information may include the parameters (e.g., the discovery target parameters 124) associated with a specified NVMe storage domain (or NVMe storage domains) the host may communicate with.

Figure 4:
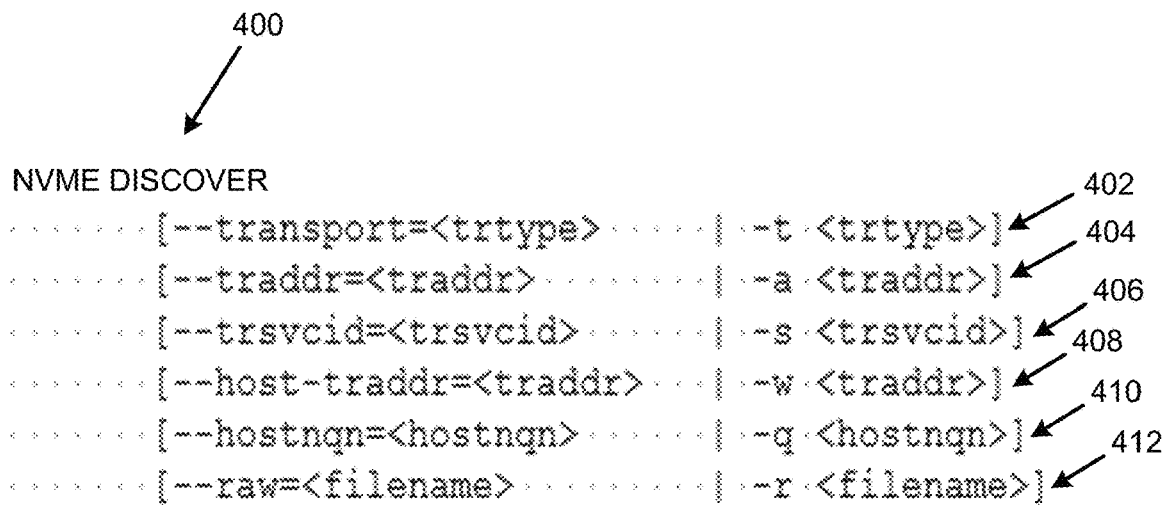
FIG. 4 illustrates nvme discover commands to illustrate operation of the universal host and NVMe storage domain discovery for NVMe-oF apparatus of FIG. 1 in accordance with an example of the present disclosure.

At 328, a host may discover NVMe subsystems using, for example, an nvme discover command. In this regard, FIG. 4 illustrates nvme discover commands 400 in accordance with an example of the present disclosure. Referring to FIG. 4, the nvme discover commands 400 may include a transport type specification (e.g., RDMA, etc.) at 402, a transport address (e.g., IP address) at 404, a transport service ID (e.g., port number) at 406, host transport address at 408, host NQN at 410, and raw at 412. The "raw" field at 412 may take the output of the nvme discover command and forward the output to a raw binary file, where, by default, the nvme discover command may forward the output to a standard output (stdout).

At 330, a discovery target may respond with subsystem discovery log pages. A discovery log page may include multiples of 1024 bytes, the format of which may be obtained from NVMe-oF specifications. Further, log pages may include several fields and details about the NVMe storage domain subsystems, where the fields and details may be specified according to NVMe standards.

Figure 5:
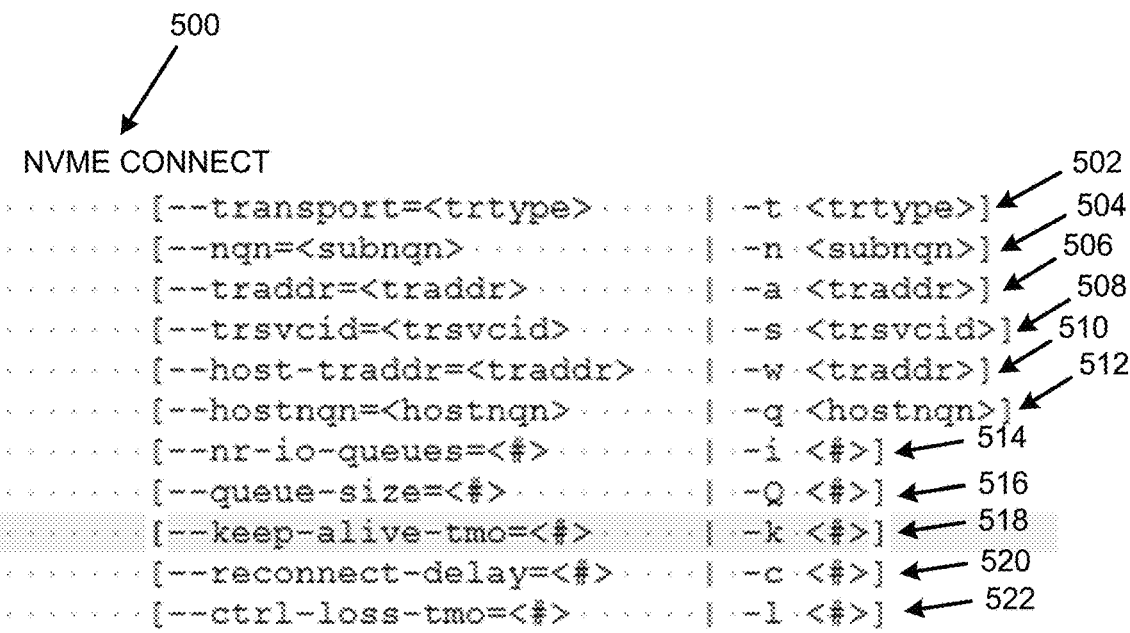
FIG. 5 illustrates nvme connect commands to illustrate operation of the universal host and NVMe storage domain discovery for NVMe-oF apparatus of FIG. 1 in accordance with an example of the present disclosure.

At 332, a host may connect to subsystem(s) using, for example, an nvme connect command. For example, FIG. 5 illustrates nvme connect commands 500 in accordance with an example of the present disclosure. The nvme connect commands 500 may be used by a host to establish the communication with a specified NVMe storage domain. The nvme connect commands may include a transport type specification (e.g., RDMA, etc.) at 502, an NVMe storage domain NQN at 504, a transport address (e.g., IP address) at 506, a transport service ID (e.g., port number) at 508, host transport address at 510, host NQN at 512, nr-io-queues at 514, a queue size at 516, a keep-alive-tmo (e.g., keep alive timeout) at 518, a reconnect-delay at 520, and control-loss-tmo (e.g., control loss timeout) at 522.

At 334, additional asynchronous events may include apparatus 100 generated additional asynchronous events (e.g., link failure, etc.).

At 336 and 338, host and target agents may process the notifications with respect to the asynchronous events generated at block 334, and take appropriate actions.

With respect to the asynchronous notifications at blocks 320 and 334, the following list includes some examples of various possible notifications.

For block 320, one type of notification may include a notification to hosts after a DD creation (if the host is a member of that DD).

For block 320, another type of notification may include a notification to hosts if there is any subsequent change to a DD (either addition or deletion of NVMe storage domains 108).

For block 320, another type of notification may include a notification to NVMe storage domains 108 if there is any subsequent change to a DD (either addition or deletion of NVMe storage domains 108).

For block 334, another type of notification may include a notification regarding link events related to members of the DD, hosts or NVMe storage domains 108 (link down or up conditions).

According to examples disclosed herein, the asynchronous notifications disclosed herein may be between the apparatus 100 and host agent or target agent, and may use TCP/IP protocol packets. In this regard, the discovery target may not be involved in these asynchronous notifications. For example, the apparatus 100 may directly communicate with either 'nns-host-agent' or 'nns-target-agent' as shown in FIG. 2. These communications may include fabric generated events and not a direct communication between a host and an NVMe storage domain. In this regard, there may be fabric services asynchronous notifications or asynchronous events that may be sent over Ethernet using a mechanism that is different from the NVMe asynchronous events.

With respect to the aforementioned communication with the apparatus 100 (e.g., communication between the host and the apparatus 100, and communication between the NVMe storage domain and the apparatus 100), such communication may utilize a TCP/IP payload and packet structure. In this regard, a message format for such communication may be designated as NNSp, which may include a message header followed by actual payload. For example, FIGS. 6 and 7 illustrate payload key fields for host and NVMe storage domain initial registration. For example, FIG. 6 illustrates key fields 600 with respect to NVMe host registration, and FIG. 7 illustrates key fields 700 with respect to NVMe discovery target registration, in accordance with an example of the present disclosure.

Referring to FIG. 6, according to an examples disclosed herein, the payload key fields for host registration may include client type as host, NQN as an NVMe Qualified Name, interface IP address as IPv4, protocol supported as RDMA (RocE v2), and MAC address as protocol MAC address. The key fields may be used to maintain a linked database, as well as for mapping purposes as disclosed herein.

Referring to FIG. 7, according to an examples disclosed herein, the payload key fields for discovery target registration may include client type as NVMe storage domain discovery target, interface IP address as IPv4, protocol supported as RDMA (RocE v2), MAC address as protocol MAC address, and NVMe port ID as a specified NVMe port ID. The key fields may be used to maintain a linked database, as well as for mapping purposes as disclosed herein.

Figure 8:
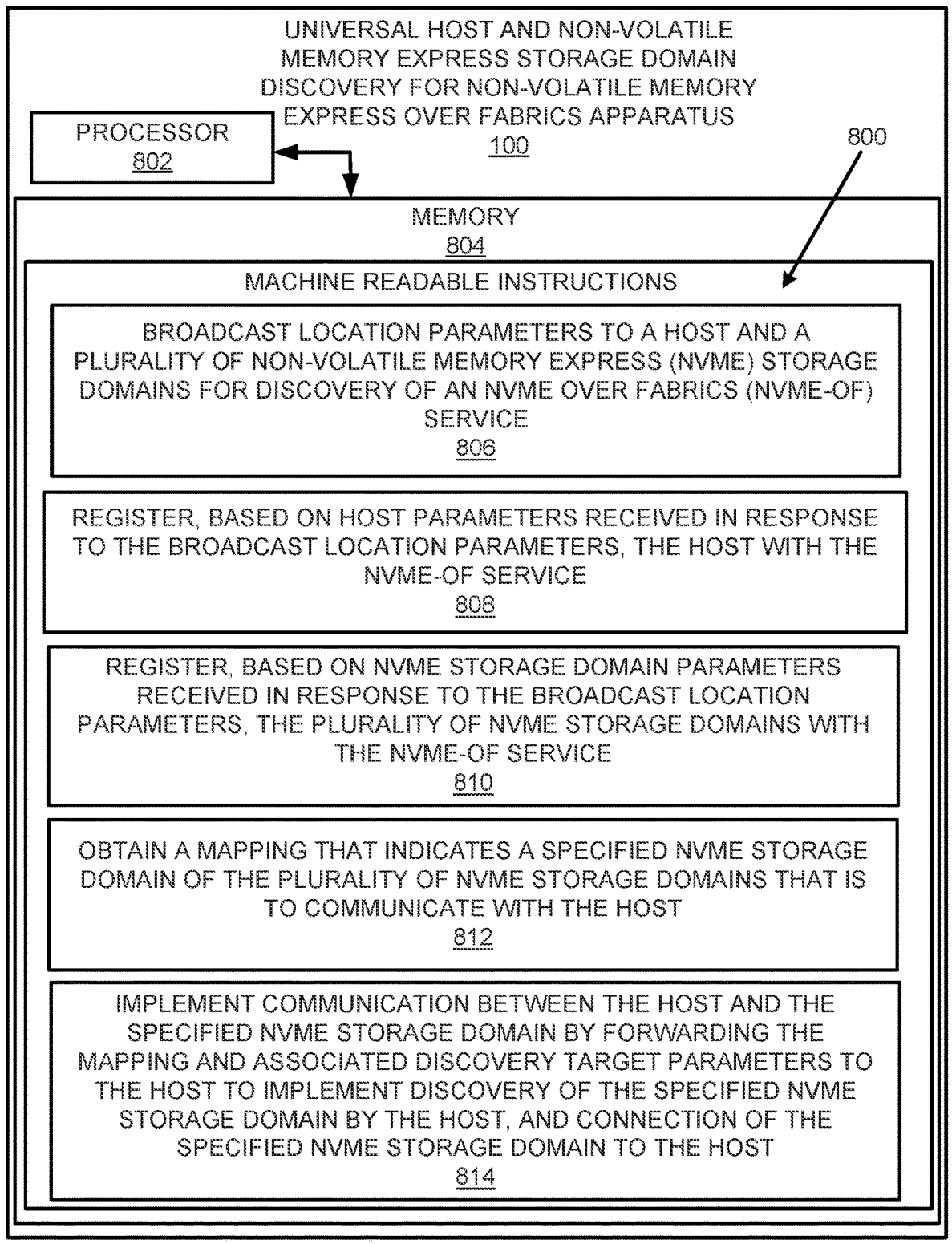
FIG. 8 illustrates an example block diagram for universal host and NVMe storage domain discovery for NVMe-oF in accordance with an example of the present disclosure.
Figure 10:
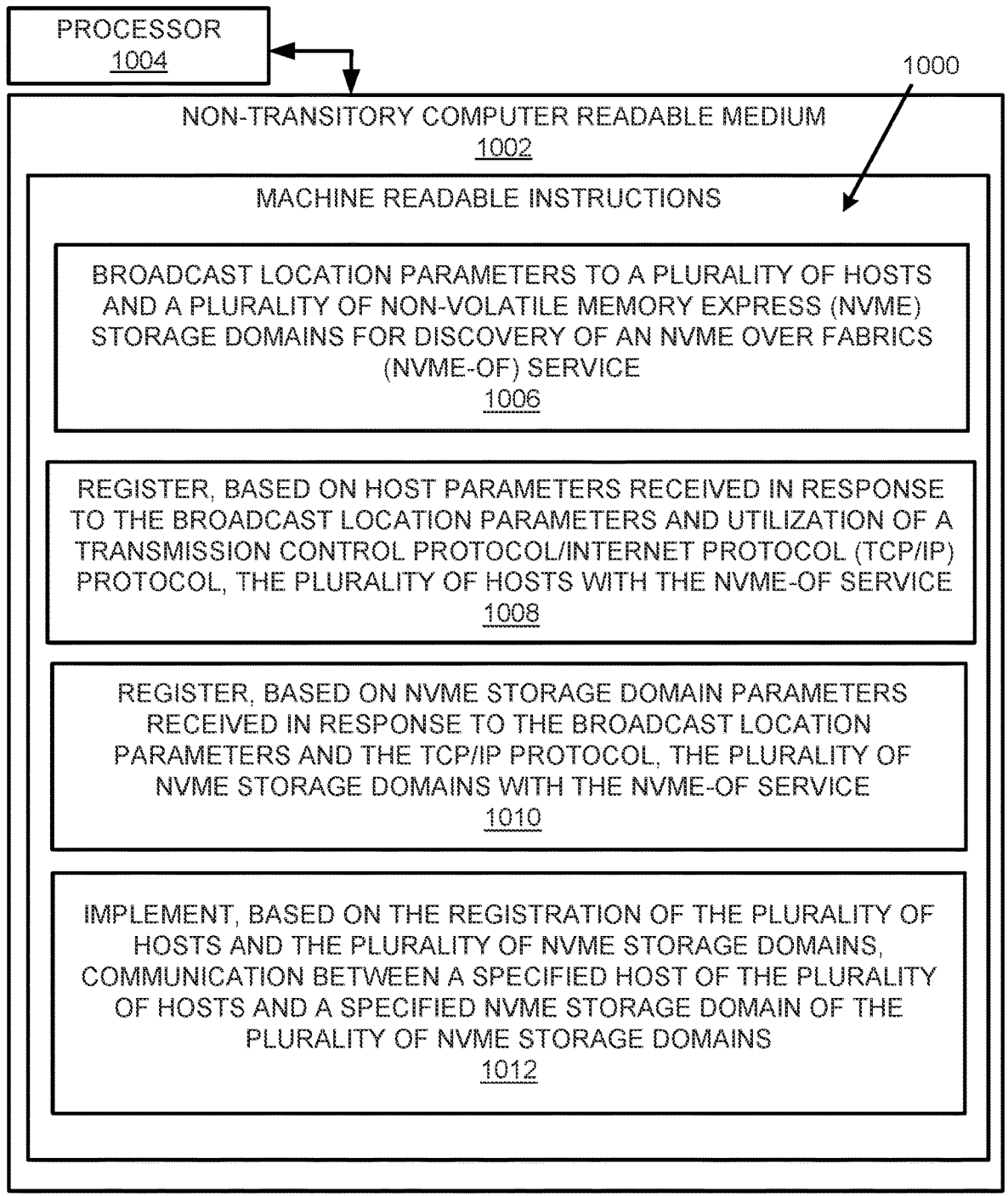
FIG. 10 illustrates a further example block diagram for universal host and NVMe storage domain discovery for NVMe-oF in accordance with another example of the present disclosure.

FIGS. 8-10 respectively illustrate an example block diagram 800, a flowchart of an example method 900, and a further example block diagram 1000 for universal host and NVMe storage domain discovery for NVMe-oF, according to examples. The block diagram 800, the method 900, and the block diagram 1000 may be implemented on the apparatus 100 described above with reference to FIG. 1 by way of example and not of limitation. The block diagram 800, the method 900, and the block diagram 1000 may be practiced in other apparatus. In addition to showing the block diagram 800, FIG. 8 shows hardware of the apparatus 100 that may execute the instructions of the block diagram 800. The hardware may include a processor 802, and a memory 804 storing machine readable instructions that when executed by the processor cause the processor to perform the instructions of the block diagram 800. The memory 804 may represent a non-transitory computer readable medium. FIG. 9 may represent an example method for universal host and NVMe storage domain discovery for NVMe-oF, and the steps of the method. FIG. 10 may represent a non-transitory computer readable medium 1002 having stored thereon machine readable instructions to provide universal host and NVMe storage domain discovery for NVMe-oF according to an example. The machine readable instructions, when executed, cause a processor 1004 to perform the instructions of the block diagram 1000 also shown in FIG. 10.

The processor 802 of FIG. 8 and/or the processor 1004 of FIG. 10 may include a single or multiple processors or other hardware processing circuit, to execute the methods, functions and other processes described herein. These methods, functions and other processes may be embodied as machine readable instructions stored on a computer readable medium, which may be non-transitory (e.g., the non-transitory computer readable medium 1002 of FIG. 10), such as hardware storage devices (e.g., RAM (random access memory), ROM (read only memory), EPROM (erasable, programmable ROM), EEPROM (electrically erasable, programmable ROM), hard drives, and flash memory). The memory 804 may include a RAM, where the machine readable instructions and data for a processor may reside during runtime.

Referring to FIGS. 1-8, and particularly to the block diagram 800 shown in FIG. 8, the memory 804 may include instructions 806 to broadcast location parameters 104 to a host and a plurality of non-volatile memory Express™ (NVMe) storage domains 108 for discovery of an NVMe over Fabrics (NVMe-oF) service 110.

The processor 802 may fetch, decode, and execute the instructions 808 to register, based on host parameters 114 received in response to the broadcast location parameters 104, the host with the NVMe-oF service 110.

The processor 802 may fetch, decode, and execute the instructions 810 to register, based on NVMe storage domain parameters received in response to the broadcast location parameters 104, the plurality of NVMe storage domains 108 with the NVMe-oF service 110.

The processor 802 may fetch, decode, and execute the instructions 812 to obtain a mapping that indicates a specified NVMe storage domain of the plurality of NVMe storage domains 108 that is to communicate with the host.

The processor 802 may fetch, decode, and execute the instructions 814 to implement communication between the host and the specified NVMe storage domain by forwarding the mapping and associated discovery target parameters to the host to implement discovery of the specified NVMe storage domain by the host, and connection of the specified NVMe storage domain to the host.

Referring to FIGS. 1-7 and 9, and particularly FIG. 9, for the method 900, at block 902, the method may include broadcasting, from a non-volatile memory Express™ (NVMe) Name Server (NNS) deployed in a switch container, a virtual machine, or an NVMe storage domain of a plurality of NVMe storage domains 108, location parameters 104 to a plurality of hosts 106 and the plurality of NVMe storage domains 108 for discovery of an NVMe over Fabrics (NVMe-oF) service 110.

At block 904, the method may include registering, based on host parameters 114 received in response to the broadcast location parameters 104, the plurality of hosts 106 with the NVMe-oF service 110.

At block 906, the method may include registering, based on NVMe storage domain parameters received in response to the broadcast location parameters 104, the plurality of NVMe storage domains 108 with the NVMe-oF service 110.

At block 908, the method may include implementing, based on the registration of the plurality of hosts 106 and the plurality of NVMe storage domains 108, communication between a specified host of the plurality of hosts 106 and a specified NVMe storage domain of the plurality of NVMe storage domains 108.

Referring to FIGS. 1-7 and 10, and particularly FIG. 10, for the block diagram 1000, the non-transitory computer readable medium 1002 may include instructions 1006 to broadcast location parameters 104 to a plurality of hosts 106 and a plurality of non-volatile memory Express™ (NVMe) storage domains 108 for discovery of an NVMe over Fabrics (NVMe-oF) service 110.

The processor 1004 may fetch, decode, and execute the instructions 1008 to register, based on host parameters 114 received in response to the broadcast location parameters 104 and utilization of a transmission control protocol/Internet Protocol (TCP/IP) protocol, the plurality of hosts 106 with the NVMe-oF service 110.

The processor 1004 may fetch, decode, and execute the instructions 1010 to register, based on NVMe storage domain parameters received in response to the broadcast location parameters 104 and the TCP/IP protocol, the plurality of NVMe storage domains 108 with the NVMe-oF service 110.

The processor 1004 may fetch, decode, and execute the instructions 1012 to implement, based on the registration of the plurality of hosts 106 and the plurality of NVMe storage domains 108, communication between a specified host of the plurality of hosts 106 and a specified NVMe storage domain of the plurality of NVMe storage domains 108.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. An apparatus comprising:
   at least one processor; and
   a non-transitory computer readable medium storing machine readable instructions that when executed by the at least one processor cause the at least one processor to:
      broadcast location parameters including an address of the apparatus to a host and a plurality of non-volatile memory Express (NVMe) storage domains for discovery of an NVMe over Fabrics (NVMe-oF) service, wherein a network fabric connects the host to the plurality of NVMe storage domains;
      register, based on host parameters of the host received in response to the broadcast location parameters, the host with the NVMe-oF service;
      register, based on NVMe storage domain parameters received in response to the broadcast location parameters, the plurality of NVMe storage domains with the NVMe-oF service;
      obtain a mapping that indicates a specified NVMe storage domain of the plurality of NVMe storage domains that is to communicate with the host; and
      implement communication between the host and the specified NVMe storage domain by forwarding the mapping and associated discovery target parameters to the host to implement discovery of the specified NVMe storage domain by the host, and connection of the specified NVMe storage domain to the host.

2. The apparatus according to claim 1, wherein the mapping includes a discovery domain that indicates the specified NVMe storage domain of the plurality of NVMe storage domains that is to communicate with the host.

3. The apparatus according to claim 2, wherein the machine readable instructions to obtain the mapping that indicates the specified NVMe storage domain of the plurality of NVMe storage domains that is to communicate with the host are further to cause the at least one processor to:
   obtain, for the discovery domain, a membership that includes a host NVMe™ NVMe qualified name for the host, a host transport address for the host, a target transport type for the specified NVMe storage domain, and a transport address for a discovery target of the specified NVMe storage domain; and
   forward content of the membership to the host to implement communication of the host with the specified NVMe storage domain.

4. The apparatus according to claim 2, wherein the machine readable instructions to obtain the mapping that indicates the specified NVMe storage domain of the plurality of NVMe storage domains that is to communicate with the host are further to cause the at least one processor to:
   obtain, for the discovery domain, a membership that includes a host NVMe qualified name for the host, a host transport address for the host, an NVMe subsystem NVMe qualified name for the specified NVMe storage domain, and a transport address and type of the specified NVMe storage domain; and
   forward content of the membership to the host to implement communication of the host with the specified NVMe storage domain.

5. The apparatus according to claim 2, wherein the machine readable instructions to obtain the mapping that indicates the specified NVMe storage domain of the plurality of NVMe storage domains that is to communicate with the host are further to cause the at least one processor to:
   obtain, from the specified NVMe storage domain, the mapping that includes the discovery domain that indicates the specified NVMe storage domain of the plurality of NVMe storage domains that is to communicate with the host; and
   forward the mapping to the host to implement communication of the host with the specified NVMe storage domain.

6. The apparatus according to claim 2, wherein the machine readable instructions are further to cause the at least one processor to:
   send, upon creation of the discovery domain, a change notification to the host; and
   forward, upon receipt of a query from the host responsive to the change notification, content of the discovery domain to the host.

7. A computer implemented method comprising:
broadcasting, from a non-volatile memory Express (NVMe) Name Server (NNS) deployed in a switch container, a virtual machine, or an NVMe storage domain of a plurality of NVMe storage domains, location parameters to a plurality of hosts and the plurality of NVMe storage domains for discovery of an NVMe over Fabrics (NVMe-oF) service;
registering, based on host parameters received in response to the broadcast location parameters, the plurality of hosts with the NVMe-oF service;
registering, based NVMe storage domain parameters received in response to the broadcast location parameters, the plurality of NVMe storage domains with the NVMe-oF service; and
implementing, based on the registration of the plurality of hosts and the plurality of NVMe storage domains, communication between a specified host of the plurality of hosts and a specified NVMe storage domain of the plurality of NVMe storage domains.

8. The computer implemented method according to claim 7, wherein implementing, based on the registration of the plurality of hosts and the plurality of NVMe storage domains, the communication between the specified host of the plurality of hosts and the specified NVMe storage domain of the plurality of NVMe storage domains comprises:
obtaining a mapping that indicates the specified NVMe storage domain of the plurality of NVMe storage domains that is to communicate with the specified host of the plurality of hosts; and
implementing the communication between the specified host and the specified NVMe storage domain by forwarding the mapping and associated discovery target parameters to the specified host to implement discovery of the specified NVMe storage domain by the specified host, and connection of the specified NVMe storage domain to the specified host.

9. The computer implemented method according to claim 8, wherein the mapping includes a discovery domain that indicates the specified NVMe storage domain of the plurality of NVMe storage domains that is to communicate with the specified host of the plurality of hosts.

10. A non-transitory computer readable medium having stored thereon machine readable instructions, which, when executed, cause an apparatus to:
broadcast location parameters including an address of the apparatus to a plurality of hosts and a plurality of non-volatile memory Express (NVMe) storage domains for discovery of an NVMe over Fabrics (NVMe-oF) service, wherein a network fabric connects the plurality of hosts to the plurality of NVMe storage domains;
register, based on host parameters of the plurality of hosts received in response to the broadcast location parameters and utilization of a transmission control protocol/Internet Protocol (TCP/IP) protocol, the plurality of hosts with the NVMe-oF service;
register, based on NVMe storage domain parameters received in response to the broadcast location parameters and the TCP/IP protocol, the plurality of NVMe storage domains with the NVMe-oF service; and
implement, based on the registration of the plurality of hosts and the plurality of NVMe storage domains, communication between a specified host of the plurality of hosts and a specified NVMe storage domain of the plurality of NVMe storage domains.

11. The non-transitory computer readable medium according to claim 10, wherein the machine readable instructions when executed cause the apparatus to:
obtain a mapping that indicates the specified NVMe storage domain of the plurality of NVMe storage domains that is to communicate with the specified host of the plurality of hosts; and
implement the communication between the specified host and the specified NVMe storage domain by forwarding the mapping and associated discovery target parameters to the specified host to implement discovery of the specified NVMe storage domain by the specified host, and connection of the specified NVMe storage domain to the specified host.

12. The non-transitory computer readable medium according to claim 10, wherein the machine readable instructions when executed cause the apparatus to:
implement, based on the registration of the plurality of hosts and the plurality of NVMe storage domains, discovery of a discovery target of the specified NVMe storage domain of the plurality of NVMe storage domains by the specified host of the plurality of hosts.

13. The non-transitory computer readable medium according to claim 12, wherein the machine readable instructions when executed cause the apparatus to:
implement, based on the registration of the plurality of hosts and the plurality of NVMe storage domains, connection of an NVMe subsystem of the specified NVMe storage domain of the plurality of NVMe storage domains to the specified host of the plurality of hosts.

14. The non-transitory computer readable medium according to claim 10, wherein the machine readable instructions when executed cause the apparatus to:
register, based on the host parameters received from host agents in response to the broadcast location parameters and the utilization of the TCP/IP protocol, the plurality of hosts with the NVMe-oF service.

15. The non-transitory computer readable medium according to claim 10, wherein the machine readable instructions when executed cause the apparatus to:
register, based on the NVMe storage domain parameters received from target agents in response to the broadcast location parameters and the TCP/IP protocol, the plurality of NVMe storage domains with the NVMe-oF service.

16. The apparatus according to claim 1, wherein the host parameters received in response to the broadcast location parameters include an address of the host that is to access an NVM in the specified NVMe storage domain over the network fabric.

17. The apparatus according to claim 16, wherein the host is to access the NVM in the specified NVMe storage domain over an Ethernet fabric or a Fibre Channel fabric.

18. The computer implemented method according to claim 7, wherein the host parameters received in response to the broadcast location parameters include an address of the specified host that accesses an NVM in the specified NVMe storage domain over a network fabric.

19. The computer implemented method according to claim 18, wherein the specified host accesses the NVM in the specified NVMe storage domain over an Ethernet fabric or a Fibre Channel fabric.

20. The non-transitory computer readable medium according to claim 10, wherein the host parameters received in response to the broadcast location parameters include an address of the specified host that accesses an NVM in the specified NVMe storage domain over a network fabric.

* * * * *